F. L. BOWLES.
MECHANICAL MOVEMENT.
APPLICATION FILED OCT. 16, 1908.
946,198.
Patented Jan. 11, 1910.
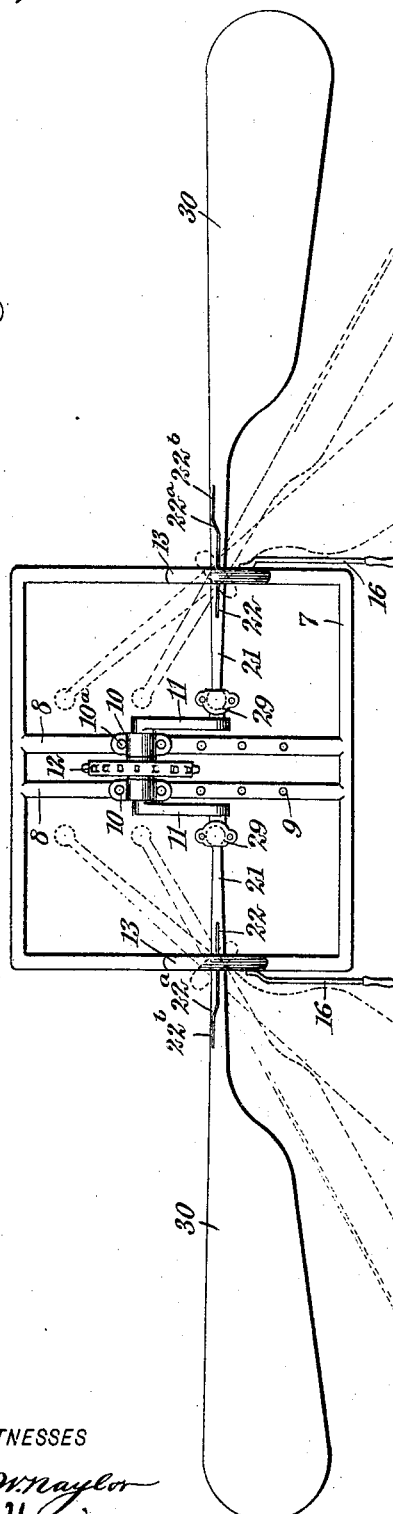
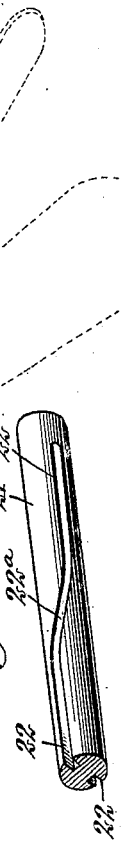
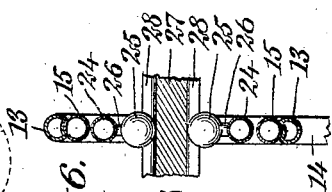
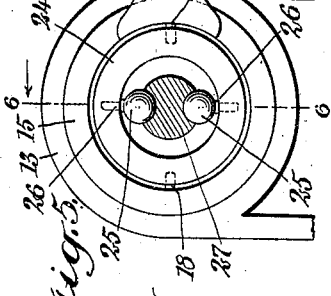
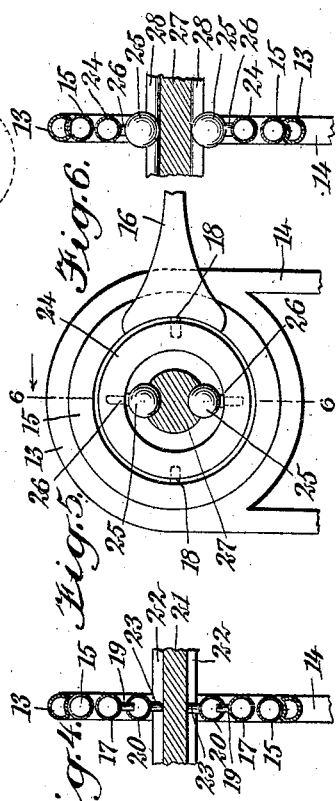
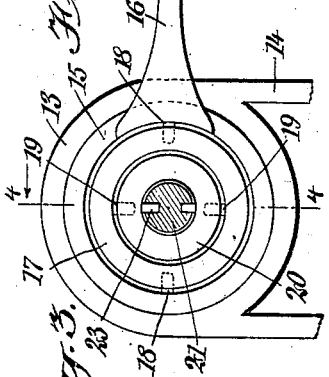
WITNESSES
Geo. W. Naylor
W. Harrison
INVENTOR
Fred L. Bowles
BY Munn & Co.
ATTORNEYS

UNITED STATES PATENT OFFICE.

FRED L. BOWLES, OF JERSEY CITY, NEW JERSEY.

MECHANICAL MOVEMENT.

946,198. Specification of Letters Patent. Patented Jan. 11, 1910.

Application filed October 16, 1908. Serial No. 457,972.

*To all whom it may concern:*

Be it known that I, FRED L. BOWLES, a citizen of the United States, and a resident of Jersey City, in the county of Hudson and State of New Jersey, have invented a new and Improved Mechanical Movement, of which the following is a full, clear, and exact description.

My invention relates to mechanical movements and admits of general use but is of special value in connection with flying machines, rowing machines, exercising machines, and in various other relations wherein it is desirable to cause a reciprocating member to feather in an arbitrary but predetermined manner, for the purpose of producing an efficient stroke.

Reference is to be had to the accompanying drawings forming a part of this specification, in which similar characters of reference indicate corresponding parts in all the figures.

Figure 1 is a plan view showing my improved mechanical movement applied to the operation of a pair of wings or blades; Fig. 2 is a perspective of one of the stems used for supporting the wings; Fig. 3 is an enlarged fragmentary side elevation showing how the feathering of the wings is controllable by aid of a hand lever; Fig. 4 is a vertical section upon the line 4—4 of Fig. 3, looking in the direction of the arrow, and showing the mountings for the wing stems; Fig. 5 is a view somewhat similar to Fig. 3 but showing a slightly different form of mounting for the stem; and Fig. 6 is a section upon the line 6—6 of Fig. 5, looking in the direction of the arrow.

A frame 7 is provided with cross bars 8 disposed parallel with each other and these cross bars are provided with holes 9. Bearings 10 rest upon the cross bars and are secured thereto by aid of bolts 10ª, these bearings being adjustable relatively to the cross bars by moving them into different positions and shifting the positions of the bolts 10ª. Journaled within these bearings are twin crank arms 11, and centered intermediate the same is a sprocket gear 12, whereby the moving parts receive their power.

Mounted upon each side of the frame 7 is a circular bearing 13, provided with downwardly-extending posts 14, whereby it is supported. Within each circular bearing 13 is a ring 15, the inner surface of the circular bearing 13 being slightly concave, as will be understood from Fig. 4, in order to hold the ring 15 revolubly in position. Mounted rigidly upon the ring 15 and extending radially inward therefrom are pivot pins 18. At 16 are shown hand levers for controlling within certain limits the feathering action of the wings. A ring 17 is journaled upon these pivot pins and is adapted to rock in a plane crossing the general plane of the circular bearing 13. The ring 17 is provided with pivot pins 19 projecting radially inward and supporting a smaller ring 20, this ring being adapted to rock in a plane coinciding substantially with the general plane occupied by the pivot pins 18. Extending through the two rings 20 are stems 21, each provided with two grooves 22. Each of these grooves is provided with a spiral portion 22ª merging into a short straight portion 22ᵇ. Guide pins 23 mounted rigidly upon the ring 20 extend into the grooves 22.

In the form shown in Fig. 5, the ring 15 and circular bearing 13 have the same construction as in Figs. 3 and 4, but mounted upon the pivot pins 18 is a ring 24 and projecting inwardly from this ring are bosses 26 each provided with a ball 25. A stem 27 engages these balls 25 and is slidable in relation to the same and to the rings. The stem 27 is provided with grooves 28 closely analogous to the grooves 22 of the structure shown in Figs. 3 and 4. The twin crank arms 11 are connected with the inner ends of the stems 21 by aid of swivel joints 29.

It will be noted that the construction shown in Figs. 3 and 4 comprises in effect a type of universal joint, in that the rings 20, 17 swing in planes crossing each other, so that the stem 21 can perform any movement permitted by a universal joint supporting it at the point where it passes through the rings. The stems 21 are provided with wings 30 which are to be actuated.

The operation of my device is as follows: The parts being arranged as indicated in Fig. 1, the operator adjusts the bearings 10 to any desired point along the cross bars 8. In doing this he varies the distance from the axis of rotation of the twin crank arms and the point of engagement between the stems 21 and the rings encircling the same. In this manner the adjustment of the bearings 10 relatively to the cross bars 8 enables the operator to vary, within moderate limits, the character and extent of the stroke of the wings 30. Suppose that the bearings 10 occupy the position indicated in Fig. 1. Rotary motion being now communicated to the sprocket 12, the twin crank arms 11 are caused to rotate, and in so doing they communicate motion through the universal joints 29 to the stems 21. These stems are first drawn inward and then pushed outward, as indicated by dotted lines in Fig. 1. The spiral portion 22ª of each cam groove 22 causes the stem to turn slightly upon its own general longitudinal axis, at one stage of the stroke; that is to say, the reciprocating motion given to either stem 21 in the general longitudinal direction of its axis causes this stem to turn slightly upon its own general longitudinal axis whenever the stem reaches such position that the guide pins 23 extend into the portions 22ª. The stems 21 are thus subjected to the action of at least two forces, the composition of which causes the wings 30 to move backwardly and forwardly, and also to feather at predetermined intervals. By a proper proportioning and adjustment of the parts, it is self-evident that the wings may be made to feather properly so as to simulate the movements of the wings of a bird in flight, or the movement of the hands and arms of a person while swimming. The hand levers 16 may be moved upward or downward at will, the movement of one being independent of that of the other. The operator grasps these levers and by their aid tilts the rings 17, 20, so as to incline the axes upon which they are pivoted. In this way the operator may still further vary the feathering effects of the wings. The adjustment of the bearings 10 relatively to the cross bars 8 and the hand controlled movement of the levers 16, together give the operator control over a wide range of movement for the wings 30, such movement being alike for both wings in so far as adjustment of the bearings 10 is concerned, but being different for the two wings as controllable by the separate levers 16.

Where the form shown in Figs. 5 and 6 is employed, the action is practically the same as that above described.

I do not limit myself to any particular use to which this invention may be applied. It is of special service in helicopters, steering and propelling mechanism for dirigible balloons, devices for the propulsion of boats, and as a gearing for exercising machines. It may also be used in various general relations wherein it is desirable to have a movable member execute a feathering movement coupled with a movement of some other kind.

Having thus described my invention, I claim as new and desire to secure by Letters Patent:

1. In a mechanical device, the combination of a frame, a pair of stems extending outwardly therefrom and each provided with a spiral portion, bearings carried by said frame provided with portions engaging said spiral portions of the stems for the purpose of causing said stems to turn when reciprocated longitudinally, a double crank adjustable relatively to said frame and adapted to apply power to said stems, and wings mounted upon said stems.

2. In a mechanical device, the combination of a stem provided with a cam groove having a straight portion and also a spiral portion, a bearing provided with a guiding member extending into said cam groove, a crank for causing one end of said stem to describe an orbit so as to move said stem in the general direction of its length relatively to said guiding member, the axis of said orbit being out of alinement with the point where said stem extends through said bearing, a frame, other bearings supporting said crank and adjustable bodily in relation to said frame, and a wing mounted upon said stem and adapted to feather when said stem turns.

In testimony whereof I have signed my name to this specification in the presence of two subscribing witnesses.

FRED L. BOWLES.

Witnesses:
 WALTON HARRISON,
 JOHN P. DAVIS.